United States Patent
Ziebart et al.

(10) Patent No.: US 7,197,940 B2
(45) Date of Patent: Apr. 3, 2007

(54) MOISTURE PROTECTION FOR AN ELECTROMECHANICAL TRANSDUCER

(75) Inventors: Volker Ziebart, Schlatt (CH); Jean-Maurice Tellenbach, Hettlingen (CH)

(73) Assignee: Mettler-Toledo AG, Greifensee (CH)

( * ) Notice: Subject to any disclaimer, the term of this patent is extended or adjusted under 35 U.S.C. 154(b) by 23 days.

(21) Appl. No.: 11/040,015

(22) Filed: Jan. 24, 2005

(65) Prior Publication Data
US 2005/0155435 A1 Jul. 21, 2005

Related U.S. Application Data

(63) Continuation of application No. PCT/EP03/50326, filed on Jul. 22, 2003.

(30) Foreign Application Priority Data

Jul. 25, 2002 (EP) .................... 02102061

(51) Int. Cl.
*G01L 1/00* (2006.01)
(52) U.S. Cl. ............... 73/781; 73/862.632; 73/862.637
(58) Field of Classification Search ............... 73/781, 73/862.632, 862.637
See application file for complete search history.

(56) References Cited

U.S. PATENT DOCUMENTS

| | | | |
|---|---|---|---|
| 4,185,496 A | * | 1/1980 | Tisone et al. ......... 73/862.632 |
| 4,680,858 A | * | 7/1987 | Johnson .............. 29/621.1 |
| 5,289,722 A | | 3/1994 | Walker et al. |
| 5,616,227 A | | 4/1997 | McCormick |
| 5,631,622 A | | 5/1997 | Hauber et al. |

FOREIGN PATENT DOCUMENTS

| | | |
|---|---|---|
| DE | 27 28 916 | 1/1979 |
| DE | 38 28 098 A1 | 3/1990 |
| DE | 40 15 666 A1 | 11/1991 |
| DE | 43 03 570 A1 | 8/1994 |
| EP | 0 610 831 A1 | 2/1994 |
| EP | 0 107 966 A2 | 5/1994 |
| JP | 01212327 | 8/1989 |
| JP | 07113697 | 5/1995 |
| SU | 1 709 724 A1 | 9/1995 |

* cited by examiner

*Primary Examiner*—Edward Lefkowitz
*Assistant Examiner*—Freddie Kirkland, III
(74) *Attorney, Agent, or Firm*—Buchanan Ingersoll & Rooney PC

(57) ABSTRACT

A multilayered coating is disclosed as a protective coating against moisture penetration for strain gauges that are or can be installed on a deformable body of a force-measuring cell. A strain gauge has a strain-sensitive electrical resistor track and connector electrodes for contacting the resistor track arranged on a carrier substrate, with a multilayered coating covering at least a part of the carrier substrate and/or of the resistor track and/or of the connector electrodes as a protective coating against moisture penetration. The multilayered coating is composed of an alternating sequence of a polymer layer and a barrier layer and consists of at least three thin individual layers. In the case where a multilayered coating is applied to a strain gauge that is already installed on the deformable body of a force-measuring cell, the multilayered coating can in addition also cover a part of the deformable body.

51 Claims, 3 Drawing Sheets

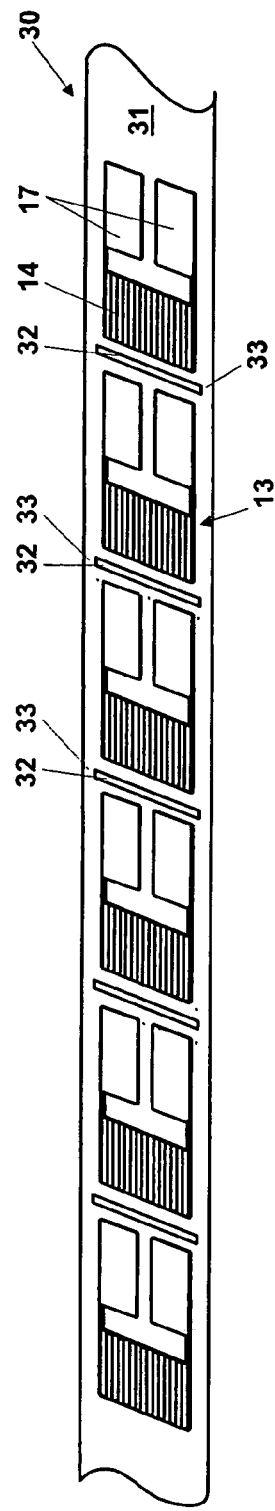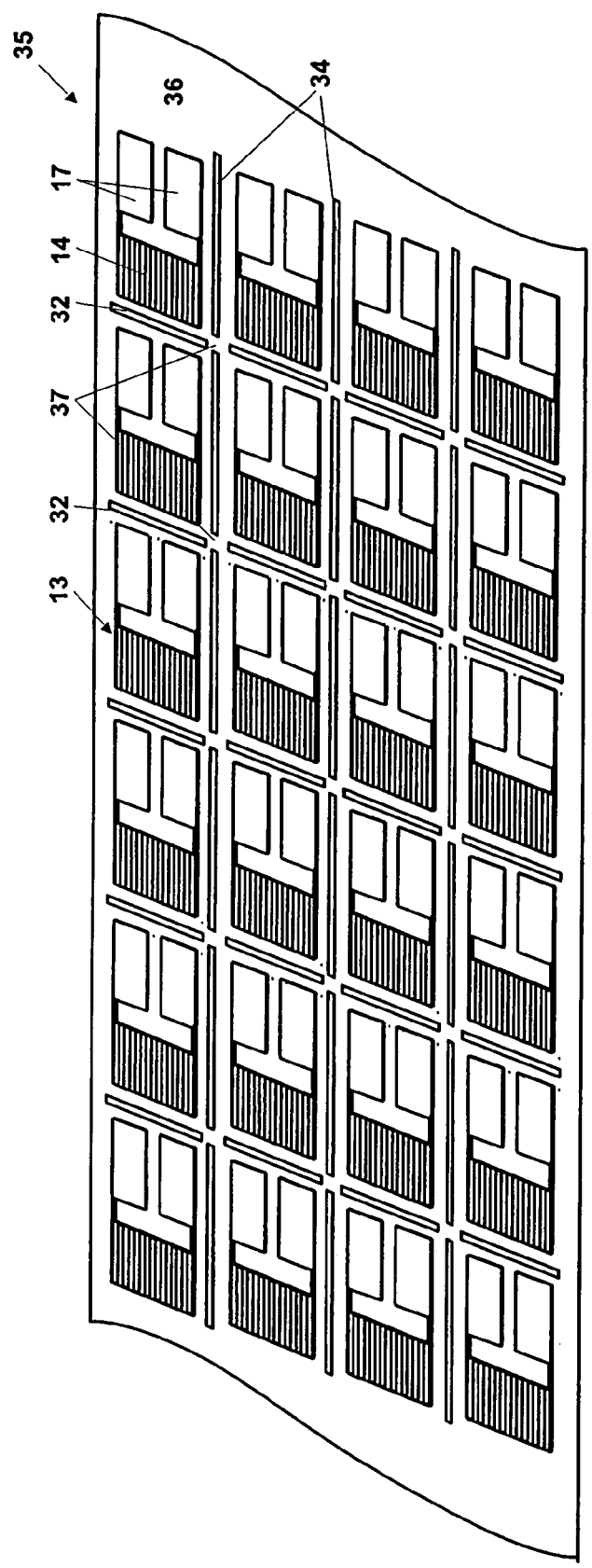

MOISTURE PROTECTION FOR AN ELECTROMECHANICAL TRANSDUCER

RELATED APPLICATIONS

This application claims priority under 35 U.S.C. §119 to European Application No. 02 102 061.5 filed in the EPO on Jul. 25, 2002, and as a continuation application under 35 U.S.C. §120 to PCT/EP03/50326 filed as an International Application on Jul. 22, 2003 designating the U.S., the entire contents of which are hereby incorporated by reference in their entireties.

BACKGROUND

1. Field

The invention relates to a force measuring cell with a deformable body and with at least one strain gauge installed on the deformable body, wherein the at least one strain gauge has a strain-sensitive electrical resistor track arranged on a carrier substrate and connector electrodes for contacting the resistor track, and wherein further the at least one strain gauge and in some cases at least a part of the deformable body are provided with a multilayer coating. The invention also relates to an individual strain gauge or to an array of strain gauges that are arranged in a row or over an area, wherein the one or more strain gauges have a strain-sensitive electrical resistor track arranged on a carrier substrate and a multilayer coating covering the resistor track and at least part of the carrier substrate. The invention further relates to a method of producing a multilayer coating on a strain gauge or on an array of strain gauges arranged in a row or over an area. In addition, the invention also relates to a force-measuring cell with a strain gauge.

2. Background Information

A strain gauge has a metallic resistor track arranged on a carrier substrate which can be made in the shape of a meandering structure by means of any known chemical etching method. Also arranged on the carrier substrate are connector electrodes for contacting the resistor track. The connector electrodes are often made in one work operation together with the resistor track, and they consist therefore in most cases of the same material. Electrically insulating materials are used for the carrier substrates of strain gauges. Depending on the area of application, one finds carrier substrates of glass, ceramic materials, in many cases polymers, glass-fiber reinforced polymers, or composite materials. Strain gauges are measuring elements in which a mechanical deformation causes a change of the electrical resistance and which are therefore used for the measurement of the force that produces the deformation.

In the field of weighing technology, to name an example, a force acting on a deformable body causes a deformation which is converted into an electrical signal by means of strain gauges. In a force-measuring cell that functions according to this principle, a load on the weighing pan which is connected to the vertically movable load-receiving part of the deformable body produces a displacement of the load-receiving part in relation to the spatially fixed part of the deformable body. In one embodiment, the deformable bodies used in force-measuring cells have four elastic bending zones formed by thin material portions which are located at the four corners of a parallelogram, so that the load-receiving part is arranged as a vertically movable leg of the parallelogram opposite a fixed, likewise vertical parallelogram leg that is preferably fastened to the housing of a weighing scale. The magnitude of the deformation that occurs in the thin bending zones is measured as an electrical resistance change by means of at least one strain gauge that is installed on one of the bending zones, in most cases by means of an electrically insulating adhesive layer.

Because of their elastic properties, polymer substrate materials are the preferred choice for strain gauges used in the field of weighing technology, in particular polyimides, but also epoxy resins, phenolic resins, melamines and ketones. Polymer carrier substrates have the advantage of a lower rigidity, so that their shape can conform more easily to the deformable body. This reduces in particular the mechanical stress in the adhesive layer. Hysteresis effects or a destruction of the adhesive layer that can occur when a rigid substrate is bonded to a deformable body are found far less often with polymer substrates. Furthermore, polymer substrates used for strain gauges with a meander-patterned resistor track offer the possibility of compensating a drift in the load signal through the known method of designing the return loops of the resistor track with an appropriately selected shape. Besides, strain gauges with polymer carrier substrates are easier to handle and more cost-effective to produce.

However, polymers have the disadvantage of a relatively high absorbance capacity for water and also for solvents, so that the humidity of the ambient air surrounding the load cell, and more particularly a change in the relative humidity, has a lasting influence on the measuring result. For example the sensitivity, the stability of the zero point and the creep properties, the so-called load drift, are parameters that are influenced by water- and solvent-related moisture in a force-measuring cell based on the strain gauge transducer principle. In measurements where the humidity of the ambient air surrounding a force-measuring cell was increased in one step from about 30% r.H. to 85% r.H. in the typical temperature range between 10° C. and 40° C., the change in this ambient parameter was found to cause a change in the weighing result of the order of some ten to a few hundred ppm (parts per million) of full span (full-load signal).

Some of the causes for the changes in the weighing results are understood and can be explained in physical terms. As a first factor, the substrate material of an unprotected strain gauge absorbs the moisture and therefore swells up, whereby the distance of the resistor track towards the bending zone is increased and the deformation that is imparted by the bending zone on the resistor track is changed by a small amount. As a second factor, the absorbed moisture changes the elastic properties of the substrate material and thereby changes the deformation parameters of the resistor track. As a third factor, an increased amount of moisture in the substrate material can cause leakage currents between neighboring parts of a meander-shaped resistor track or even between the resistor track and the metallic deformable body. While these effects are small in relation to the full-span signal, as shown by the aforementioned measurements, their influence on the measuring signal of a force-measuring cell that has to meet the highest accuracy requirements is nevertheless still unacceptably large. Protective devices and/or protective measures are therefore used in order to obtain a measuring signal that remains largely unaffected by conditions of the ambient environment, in particular by moisture acting on the substrate material and/or on the resistor track.

The known state of the art offers measures for the protection of strain gauges from moisture that causes a change in the measuring signal. For example DE 27 28 916 A1 describes the covering of a strain gauge installed on a measuring transducer. First, an electrically insulating layer is applied, for example a resin, or the strain gauge is imbedded in this layer so that a part of the transducer body that surrounds the strain gauge is likewise covered. A metallic layer is arranged on top of the electrically insulating layer and likewise covers a part of the transducer body. Thus, a strain gauge that is already installed on a transducer can be sealed against moisture effects.

A concept for protecting strain gauges against humidity is disclosed in U.S. Pat. No. 5,631,622, where an electrically insulating polymer coating is applied to the strain gauges and a metal foil is laminated onto the coating as an additional covering after a quantity of strain gauges have been produced in the form of an array on a sheet and before the sheet has been cut apart into the individual strain gauges. After the separating step, the metal foil still provides a large-area protective covering against humidity for each individual strain gauge.

As a means for protecting a strain gauge against corrosion and to improve the measuring properties, it is proposed in JP 7 113 697 A to stop moisture from entering by applying a thin inorganic film, for example $SiO_2$ with a thickness of about 100 nanometers (nm), to the surface of the strain gauge as a kind of barrier against humidity. Subsequently, an inorganic insulating film, for example polyimide with a thickness of about 10 micrometers (μm) is applied which serves to plug microscopically small holes or breaks in the inorganic film, so-called pinholes through which moisture could still penetrate. The protection achieved by this dual-layer covering is not always satisfactory, in particular in highly sensitive force-measuring cells that are designed for relatively small loads.

A force transducer with strain gauges is disclosed in DE 40 15 666 C2, wherein a vapor-deposited diffusion-tight electrically insulating coating of silicon oxide or silicon carbide, preferably two to four micrometers thick, is applied to a strain gauge and the adjacent portion of the carrier substrate. Another embodiment can also have a coating of a silicon oxide layer at the bottom which is overlaid with a metallic layer, preferably a layer of nickel.

The solutions of the foregoing description suffer from the problem that the protective coatings or protective foils which form cover over the whole strain gauge, in particular the inorganic coatings or foils with a strong barrier effect, have a comparatively large mass and a high degree of stiffness so that they, too, cause a change in the measuring result produced by the strain gauge. This problem exists regardless of whether the protective coverings are applied directly to the strain gauge that is already installed on the measuring transducer or whether a covering is applied simultaneously to a large number of strain gauges following their production. The measurement errors are caused by so-called bypass forces that are caused by overlaying the strain gauge with a relatively thick coating or foil of the order of several microns as disclosed in the state-of-the-art references. Metal coverings or foils in particular, because of their comparatively high stiffness even if they are only a few microns (μm) thick, contribute measurably to a force bypass. A force bypass occurs for example as a result of thick inorganic protective coatings as they have a high stiffness of their own and thus contribute significantly to the overall stiffness of the aforementioned bending zones of the deformable body. This problem is particularly pronounced in force-measuring cells for the measurement of small forces, because the bending zones are in this case very thin in order to provide a high sensitivity. Consequently, undesirable changes of the elastic properties of the protective covering, such as for example an elastic after-effect (also known as creep), a high inelastic component, in particular a strain hysteresis, cause a measurement error that is not reproducible and therefore not amenable to software-based compensation techniques.

On the other hand, there is no question that passages for moisture that can occur particularly in very thin moisture barrier coverings, so-called pinholes as described in JP 7 113 697 A, need to be prevented or that at least their effects need to be reduced to the largest extent possible.

An adhesive strip which is described in EP 0 107 966 A2 has a polymer substrate topped by a layer of aluminum, and there is also an adhesive layer by means of which the adhesive strip is adhesively overlaid on a strain gauge that has been installed on a force-measuring cell, as a protective means against moisture penetration. In addition, the electrical connections of the strain gauge are covered by a caption foil.

SUMMARY

A protective coating is disclosed for strain gauges that are or can be installed on a deformable body of a force-measuring cell which on the one hand prevents moisture from entering and on the other hand avoids or at least significantly reduces bypass forces.

Exemplary embodiments use the excellent barrier properties that are found in the predominantly inorganic materials and, by using very thin barrier coatings, achieves a reduction of the very high stiffness associated with the thick inorganic coatings that are used under the existing state of the art. This occurs in a plurality of layers with an alternating sequence of thin barrier layers and thin polymer layers. Polymer layers, although they have only a moderate barrier effect and therefore can often not provide adequate moisture protection by themselves, have the advantage of a considerably lower stiffness. When used in combination with thin, predominantly inorganic barrier layers, the polymer layers are a suitable means of reducing the overall stiffness of a coating with a plurality of layers. This concept preserves the advantages mentioned at the outset which are associated with the low stiffness of a polymer substrate material for a strain gauge. With the very thin barrier layers in the multi-layered coating, the drawback of bypass forces described above is avoided to the largest extent possible. A predominantly inorganic either electrically insulating or metallic layer as a barrier layer with a thickness of about 5 nanometer (nm) to 200 nm, in individual cases up to 500 nm, preferably however 10 nm to 50 nm, has a comparatively low stiffness of about the same order of magnitude as the polymer layers adjacent to the barrier layer.

The so-called pinholes that are known from the coating technology for thin films, i.e., microscopically small holes or also fissures in the barrier layers, are likewise reduced by the polymer layers in the multilayered coating. The size and number of the pin holes in a barrier layer depend on the roughness and flatness of the underlying base surface besides many other coating parameters including the coating material itself, but they depend only to a small extent on the thickness of the coating layer. The polymer layers have a smoothing effect which to a large extent prevents the occurrence of pin holes or at least diminishes their influence. The sequence of thin barrier layers with a thickness of about 5 nm to 200 nm, in individual cases up to 500 nm, preferably however 10 nm to 50 nm, and polymer layers with a thickness of 50 nm up to about 1500 nm provides first of all a certain sealing effect for the aforementioned pinholes and secondly has the effect that the pinholes are in staggered positions from one barrier layer to the next, whereby the moisture is prevented from breaking through at such weakened locations because the water and solvent molecules are held up by a labyrinth-like hurdle. Thus, an effective moisture protection can be achieved for strain gauges without producing a harmful effect on the result of the measurement.

Exemplary embodiments remove another disadvantage associated with thick inorganic barrier layers, i.e., the risk that the coating will peel off, which is referred to as delamination. The cause of delamination lies in the considerable mechanical stresses which occur at the transition from the surface of the strain gauge to the barrier layer and which are due to the high stiffness of a comparatively thick barrier layer. Using thin barrier layers alternating with thin polymer layers in accordance with exemplary embodiments of the invention gives a very high stability to the coating with regard to the undesirable peeling off a barrier layer from its underlying base surface.

When used in accordance with exemplary embodiments of the invention as overall thin multilayered protective coatings and with a sequence of thin primarily inorganic barrier layers and surface-smoothing polymer layers, the multilayered coatings can cover a strain gauge that has already been installed on a force-measuring cell or a strain-gauge that is designed for installation on a force-measuring cell. A purpose of the multilayered coatings is to minimize the negative effects on the measurement performance of such a force-measuring cell which would otherwise occur because of moisture penetration, and at the same time to largely prevent bypass forces which occur with thick barrier layers or barrier foils and which falsify the very same measuring performance that is to be secured by the barrier layers or foils.

By applying the concepts of the foregoing description, the sensitivity of force-measuring cells with one or more strain gauges that are installed as transducer elements on a deformable body is strongly improved so that for example the resolution of weighing scales equipped with these force-measuring transducers can be raised to a level which has heretofore been reached only with balances that work according to the principle of electromagnetic force compensation.

BRIEF DESCRIPTION OF THE DRAWINGS

The invention will be explained hereinafter in further detail by way of exemplary embodiments with reference to the drawings which are schematically simplified, wherein

FIG. 6 illustrates an exemplary array of strain gauges in a row with slits in the carrier material between neighboring strain gauges;

FIG. 7 illustrates an exemplary array of strain gauges extending over a two-dimensional area, with slits in the carrier material between neighboring strain gauges.

DETAILED DESCRIPTION

Figure 1:
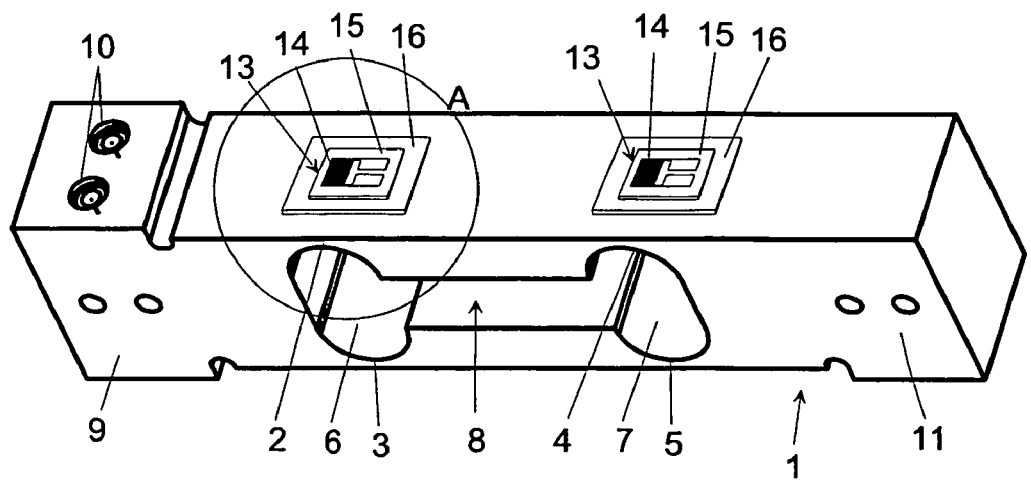
FIG. 1 represents a three-dimensional view of an exemplary deformable body of a weighing cell with strain gauges installed on the thin material portions that form the bending pivots.

FIG. 1 illustrates an exemplary deformable body 1 of a weighing cell with four elastic bending zones 2, 3, 4, 5 arranged at the corner points of a parallelogram. The bending zones 2, 3, 4, 5 are formed by the curved contours of widened end portions 6, 7 of a cutout 8 at the center of the monolithic deformable body 1. The load receiver 9 of the deformable body 1, which is shown in the left-hand part of FIG. 1, is vertically movable. If a load is put on a weighing pan which is not shown in the drawing but can be fastened by means of several screws to the tapped holes 10 of the load receiver 9, the load receiver 9 is moved vertically downward in relation to a stationary part 11 (shown in the right-hand part of the drawing) of the deformable body 1 as the bending zones 2, 3, 4 and 5 undergo a deformation. This deformation is measured by means of strain gauges 13 that are adhesively bonded to the topside 12 of the deformable body 1 at the bending zones 2 and 4. The strain gauges have a strain-sensitive resistor track 14 which is arranged preferably in the shape of a meandering pattern on a carrier substrate 15. With preference, strain gauges 13 are arranged not only at the bending zones 2, 4 on the topside 12 of the deformable body 1 but also at the bending zones on the bottom side of the deformable body 1 which is not visible in the drawing. The strain gauges 13 are provided with a multilayered coating 16 whose design and function will be explained below in more detail. The multilayered coating 16 has several layers and protects the strain gauge against penetrating moisture, i.e., water or solvents. The multilayered coating 16 is drawn here as a transparent coating in order to make the individual strain gauges 13 recognizable in each drawing. However, there is no need for the multilayered coatings 16 in their actual embodiments to be transparent for light.

In the embodiment shown in FIG. 1, the multilayered coating 16 has been applied directly to the strain gauge 13 after it has already been installed on the deformable body 1, for example by a vapor-deposition technique. This makes it possible to cover the strain gauge 13 in its entirety, i.e., the carrier substrate 15 and the resistor track 14 and even a surrounding area of the deformable body 1 and to thereby provide a complete seal against the penetration of moisture. In particular, the coating also covers the epoxy resin which is often used as an adhesive bonding agent and which was used here to install the strain gauge on the deformable body, spreading slightly outside the border of the strain gauge (see FIG. 2). This means that moisture-related influences of the bonding material which affect the weighing performance are likewise prevented. By completely covering the borders and edges of the strain gauge with the multi-layered coating, the effects that could be caused by the possible entry of moisture at the borders and edges are also avoided. In this manner, the rate of change of the aforementioned measurement characteristics of a force-measuring cell which are affected by changes of the humidity in the ambient atmosphere, i.e., the sensitivity, the stability of the zero point, and the creep properties, can be reduced in magnitude by a factor of $10^2$ to $10^6$. Consequently, these parameters will in most cases be practically unaffected by changes in ambient atmospheric humidity over the lifetime of a force-measuring cell.

It should be mentioned at this point that a non-coated strain gauge on a polyimide substrate that has already been optimized in regard to moisture absorption is permeated by water or solvents at the rate of about one gram per square meter per day (1 g/m²/d) under the test conditions of an ambient humidity differential of 90% rH and a temperature of 23° C. With the coating of the strain gauge according to the invention, this level of moisture absorption is lowered by several powers of ten, so that the rate of change of the aforementioned parameters of a force-measuring cell will be reduced accordingly.

As the coating is in this case applied to a strain gauge that is already installed on a force-measuring cell, a vapor deposition in an air atmosphere can be used as a particularly cost-effective coating technique. In a coating method of this kind which is known as combustion chemical vapor deposition (CCVD), the vapor of a substance that is, for example, in solution is heated in a gas flame, where the substance undergoes a chemical reaction before it settles on a substrate that is positioned near the flame.

Figure 2:
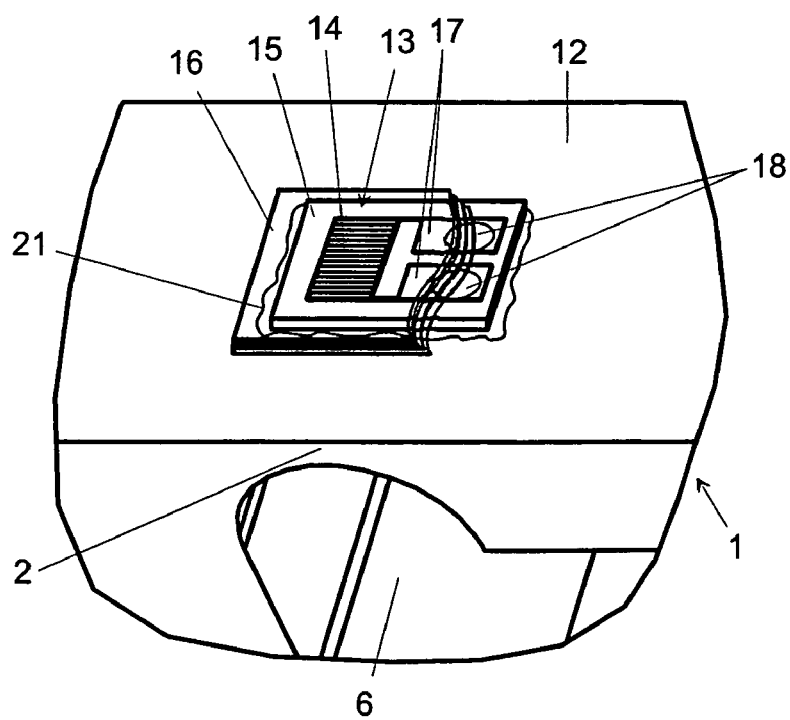
FIG. 2 represents an enlarged three-dimensional view of the part of the deformable body that is framed by the circle A in FIG. 1, carrying a strain gauge that is provided with a multilayered coating.

FIG. 2 gives an enlarged view of the part of the deformable body 1 that is framed by the circle A in FIG. 1. As in FIG. 1, the strain gauge 13 that is installed at the bending zone 2 is illustrated. In addition, FIG. 2 shows the multi-layered coating 16 covering the strain gauge 13 and a part of the topside 12 of the deformable body 1, and also covering in particular the aforementioned adhesive layer 21. For the sake of clarity, the multi-layered coating 16 is again drawn as a transparent coating and cut open on the side that faces to the right in the drawing. Also visible are the connector electrodes 17 of the meander-shaped resistor track. Of course, the connector electrodes 17 have to remain accessible for the connection of the sensor-bridge circuit (not shown here) even after a multilayered coating 16 has been applied. At the same time the multilayered coating 16 should not be damaged beyond the area of the contact location in the process of attaching the contact leads. This can be achieved for example by putting a drop of the electrically conductive connecting material on the connector electrodes 17 already before the coating process and thereby creating the contact pads 18 shown as ovals in the drawing. In the process of attaching the contact leads, only the portion of the multilayered coating 16 that covers the contact pads 18 is opened and other parts of the multilayered coating 16 remain undamaged.

Figure 3:
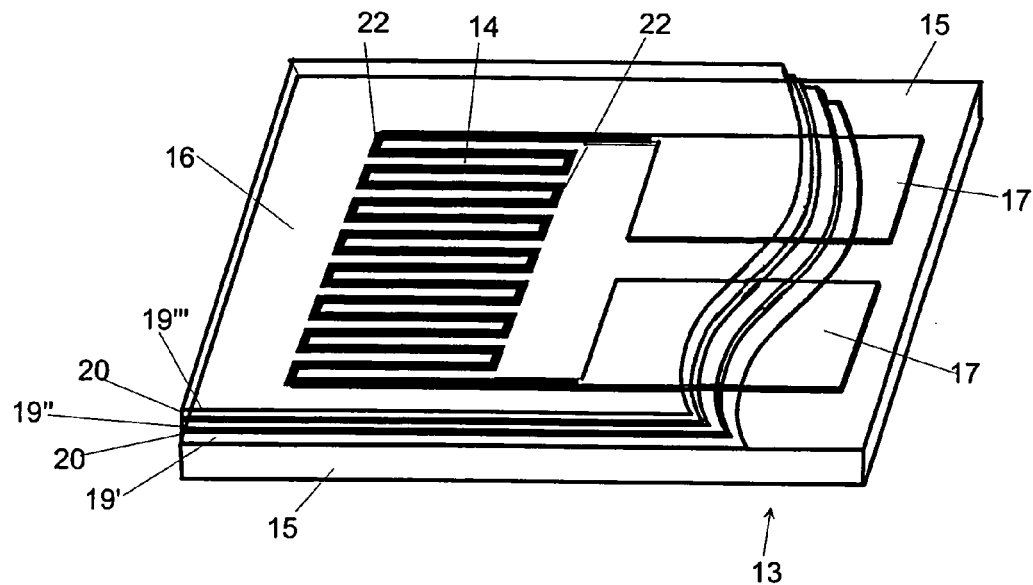
FIG. 3 represents a three-dimensional view of an individual strain gauge with a multilayered coating.

FIG. 3 is a three-dimensional illustration of an exemplary individual strain gauge 13 that is provided with a multilayered coating 16 of the kind that can also be used for a multilayered coating arrangement in accordance with FIGS. 1 and 2. For the sake of clarity, the multilayered coating 16 is again drawn as a transparent coating that is cut open on the right. It consists of a regular sequence of polymer layers 19, preferably of a polyacrylate or polymethacrylate, and barrier layers 20 of a predominantly inorganic electrically insulating material, wherein the polymer layers 19 have a thickness of typically 50 to 500 nm, preferably 100 nm to 200 nm, but in individual cases also going beyond this range up to a layer thickness of 1500 nm. The layer thickness of the barrier layers 20 is typically between 5 nm and 200 nm, preferably between 10 nm and 50 nm, but in individual cases also up to 500 nm.

Figure 4:
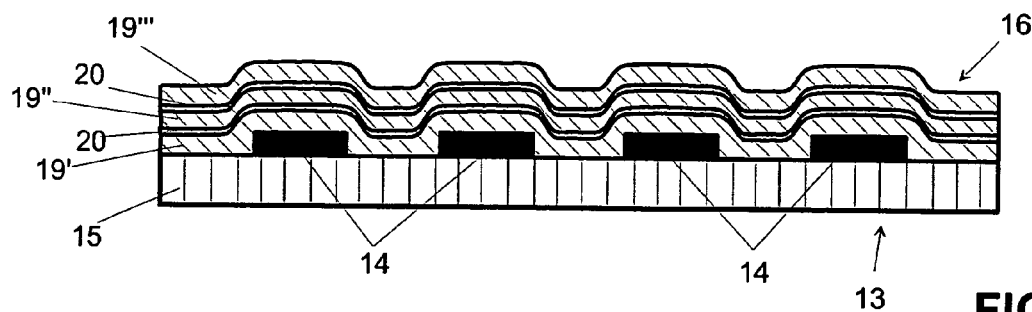
FIG. 4 represents a sectional view of an exemplary individual strain gauge with a multilayered coating.

The arrangement and an exemplary sequence of the individual layers in the multilayered coating 16 is illustrated in FIG. 4, showing a sectional view of a strain gauge 13 to which a multilayered coating 16 consisting of a total of five thin individual layers has been applied. However, the drawing is very much of a schematic character, and the respective thicknesses of the carrier substrate 15, the resistor track 14, the barrier layers 20, as well as the polymer layers 19', 19", and 19' are not drawn to scale.

In the multilayered coating 16, the first layer 19' which directly adjoins the carrier substrate 15 and, in the areas where the resistor track 14 extends over the substrate 15, directly adjoins the resistor track and which is in direct contact with the substrate and the resistor track is preferably an acrylate polymer layer which serves to smooth out the surface roughness of the carrier substrate 15 and the resistor track 14. It may in some cases have a greater thickness than the intermediately positioned further polymer layers 19" of the multilayered coating 16. Acrylate polymer layers of this type can be used to smooth out a roughness in the nanometer range of an underlying surface. This favors the formation of a next-following barrier layer 20 with only a small number of faults, meaning that the formation of pinholes in the first barrier layer 20 is reduced as a result of the smoothing effect of its underlying layer.

A further reason for depositing the first polymer layer 19' of the multilayered coating 16 with a somewhat greater thickness than the other polymer layers 19", 19' comes from the requirement that particularly in the embodiments of FIGS. 1 and 2 the contour edges of the resistor track 14 and in particular the border edges of the carrier substrate 15 as well as the protruding portions of the adhesive layer 21 need to be completely covered. A polymer layer of the aforementioned kind meets this requirement on the one hand because of its capability to smooth out a surface roughness in the nanometer range and on the other hand because it can also to some extent smooth out irregularities in the micrometer range as well as cover those areas than are predominantly perpendicular to the plane of the layer. Thus, the polymer layer provides the foundation for forming barrier layers 20 of uniform thickness and a small incidence of faults and also for forming the subsequent layers of the multilayered coating 16.

It may happen that in the course of a surface treatment prior to the application of the smoothing first polymer layer 19' for cleaning purposes, for example a plasma cleaning of the carrier substrate 15 and/or of the resistor track 14 which extends on the substrate, a thin insulating sublayer is formed over the carrier substrate 15 and the resistor track 14 that lies on the substrate 15. One may also find it necessary to arrange an insulating sublayer consisting, for example, of only a few layers of atoms underneath the first polymer layer 19' in order to achieve a better adhesion of the smoothing polymer layer 19'.

The first barrier layer 20 is followed by an intermediate layer of polymer. This intermediate layer serves to stabilize the first barrier layer 20 and also through its smoothing effect to reduce the occurrence of pin holes in a further barrier layer 20 that follows next after the intermediate layer 19". However, the intermediate layer 19" prevents in particular that the few pinholes that will still occur in a second barrier layer 20 could attach themselves to the pinholes of the first barrier layer 20, which would again favor the penetration of moisture. Rather, with the respective locations of the pin holes in the first and second barrier layers 20 being independent of each other, a kind of labyrinth barrier is set up against the entry of moisture, in particular water or solvent molecules. This labyrinth effect leads in a multilayered coating with an alternating sequence of barrier layers 20 and polymer layers 19 to a drastic reduction of the rate of moisture penetration.

The multilayered coating 16 shown in FIG. 4 has five thin individual layers, where the first layer is the smoothing polymer layer 19' and the cover layer against the ambient atmosphere is again a polymer layer 19' which serves to stabilize the multilayered coating 16 in particular against mechanical damage. The multilayered coating 16 can have further individual layers, as the alternating sequence of polymer layer 19 and barrier layer 20 can in principle be repeated any number of times. However, the multilayered coating 16 can, for example, also consist of a total of only three thin individual layers, arranged so that a polymer layer 19' is followed by a barrier layer 20 which is in turn followed by a polymer layer 19'.

The material for the barrier layers 20 can be selected from a multitude of the predominantly inorganic insulating materials that can be applied by different deposition processes. Examples to be mentioned here are oxides, nitrides, fluorides, carbides, borides, or combinations thereof, in particular oxi-nitrides, or also ceramic mixtures. In particular silicon oxide, titanium oxide, chromium oxide, aluminum oxide, silicon nitride and titanium nitride have proven to be suitable materials for barrier layers 20. Layers of so-called "diamond-like carbon" can likewise be used as barrier layers 20.

Other materials that could be used for the barrier layers 20 also particularly include metals, for example silver, aluminum, gold, chromium, copper, nickel, titanium, as well as alloys, for example nickel-cobalt alloys, or intermetallic compounds, for example of aluminum and copper, or tungsten and copper, titanium and aluminum.

Besides acrylate polymers, there are also further polymer materials that could be used for the polymer layers 19. One could name for example polymer amides, alkyds, styrols, xylylenes, phenylenes, aldehydes, esters, urethanes, epoxides, imides, phenols, ketones as well as fluor polymers or copolymers, to give only an open-ended listing. In the end, an optimizing compromise between barrier effect, compatibility of the barrier layer 20 with the polymer layer 19, as well as economical aspects of the deposition method will lead to the decision on which barrier layer materials and which polymer materials to use.

Another class of materials that can be used as intermediate polymer layers 19" or polymer cover layer 19' are the inorganic-organic hybrid polymers with the trade name "ORMOCER". These materials which are described in DE 38 28 098 A1 and DE 43 03 570 A1 have good elasticity and a certain barrier effect against moisture penetration. However, the barrier property is not effective enough for these materials to be suitable as a barrier layer 20. The ORMOCER materials have the special advantage that they can be applied in an air atmosphere, for example by spraying, centrifugal methods, or tampon-print method.

Regardless of the question of the material, a thin barrier layer 20 has commensurately low stiffness. In combination with the basically flexible polymer layer 19, one can therefore expect that the application of a multilayered coating 16 with ultra-thin barrier layers 20 to the strain gauge 13 will cause only minimal bypass forces. The danger that the ultra-thin barrier layers 20 will peel off from their underlying base surfaces (delamination) is massively reduced for the same reason, and this problem could not be observed for the materials used within the scope of the invention.

The coating of strain gauges 13 with a multilayered coating 16 according to exemplary embodiments of the invention can occur after the strain gauges 13 have been produced and while they are still connected in a row or a two-dimensional array. However, when the arrays are cut apart into individual strain gauges 13, the edge surfaces of the carrier foil in particular remain open and accessible to the penetration of moisture. Nevertheless, with the large surface ratio between the topside and the lateral edge surfaces of a strain gauge, the protection provided by the multilayered coating 16 according to the invention is still considerably high. It is possible with this very effective coating method to produce strain gauges 13 with a moisture absorption that is reduced by a factor of 50 to 1000 in comparison to non-coated strain gauges, depending on the materials used. In case a stronger barrier effect is needed, one could also put an all-around coating on individual strain gauges, whereby the edge surfaces of the carrier substrate 15 would be covered, at least with careful handling.

A possible way of applying a protective covering, particularly in the form of a multilayered coating of the foregoing description, to the edges of strain gauges 13 that hang together in a row or a two-dimensional array will now be described with reference to FIGS. 6 and 7. FIG. 6 shows a single-row arrangement 30 of strain gauges 13. Between the resistor patterns 14 with their connector electrodes 17, the carrier substrate of the single-row array 30 is perforated by narrow slits 32 that run transverse to the lengthwise dimension of the single-row arrangement 30, with the slits ending short of the entire width of the carrier substrate 31 of the single-row array 30. The slits in the carrier substrate 31 can be made, after attaching the resistor pattern, by different methods such as water-jet cutting, laser cutting, or preferably by die punch cutting after the resistor patterns 14 and the connector electrodes are in place. This step is performed prior to coating the single-row arrangement 31 with a protective covering, in particular with a multilayered coating 16 of the foregoing description. As a result, the protective coating will now also cover the edges of the strain gauge except for the connecting portions 33 of the carrier substrate 31 which are left in place during the coating process but are dimensioned as narrow as possible and which are subsequently cut apart when the individual strain gauges are separated from each other.

FIG. 7 shows an exemplary two-dimensional arrangement 35 of strain gauges 13 where the carrier substrate 36 of the two-dimensional array 35 is perforated in the spaces between the individual resistor patterns 14 with their connector electrodes 17 by slits 32 aligned one way and perpendicularly aligned slits 34 so that the substrate hangs together only by four connecting portions 37 at the corners of each strain gauge 13. The slits 32, 34 are made at those locations of a carrier substrate where the two-dimensional array is subsequently broken up when the individual strain gauges 13 are separated from each other. However, the arrangement of the slits can be modified in many ways, for example so that the individual resistor patterns 14 with their connector electrodes 17 are partly surrounded by slits forming right angles with only two or three connecting portions of the substrate 36 left in place around each strain gauge 13. Of course, the strain gauges could also be connected to each other through more than four connecting portions.

Exemplary embodiments minimize the areas where the carrier substrate 31, 36 is tied together by the connecting portions 33, 37, i.e., to make the surface areas of the connecting portions 33, 37 on the one hand small enough to maximize the part of the edges of a strain gauge 13 that can be covered by the protective coating and on the other hand to ensure that the carrier substrate 31, 36 hangs together with sufficient strength so that the single-row array 30 or two-dimensional array 35 can be safely handled. It has been shown that the measures just described are very effective in improving the resistance to moisture penetration in comparison to strain gauges in single-row and two-dimensional arrays made with the existing state of the art and that the sensitivity of a force-measuring cell equipped with strain gauges according to the invention is decisively improved.

The width of a slit 32, 37 should be appropriately selected so that on the one hand not too much substrate material is lost between the individual strain gauges 13 and on the other hand to ensure a sufficient coverage of the edge surfaces of a strain gauge 13 in the process of applying the coating materials. A width of about 0.5 mm can be given as a general guideline.

It is not necessary for the individual barrier layers 20 in a multi-layered coating 16 to be of the same material. The polymer layers 19, likewise, are not limited to a single material.

It is also possible within the scope of the invention to build up one or more of the barrier layers 20 with a plurality of sublayer using either identical or different materials. Such barrier layers with multiple sublayer of different internal structure increase the labyrinth effect. It is likewise possible that individual polymer layers 19', 19'', 19' can be composed of two or more sublayer. One factor to consider here is that the barrier layers 20 and the polymer layers 19 are thin; e.g., their respective layer thicknesses are in the range given above, and the overall thickness of the multilayered coating 16 of strain gauges for use in high-sensitivity force-measuring cells do not exceed one micron, with ten microns being the upper limit, so that no significant bypass forces occur.

The thickness of the individual barrier layers or polymer layers in a multilayered coating and in particular the overall coating thickness depends on the load capacity and the sensitivity required of a force-measuring cell that is equipped with the coated strain gauges, notwithstanding the fact that the used materials or other coating parameters also play a part. In other words, the higher the load capacity of a force-measuring cell, the larger the bypass forces that can be tolerated which, as mentioned above, can be caused by a protective coating on a strain gauge. It can be stated as a general principle that the thinner a multilayered coating is, in particular the thinner the barrier layers in the coating, the better it will be suited for use as a protective coating on a strain gauge. However, as an empirically found guideline so to speak, one should work on the basis that a force-measuring cell used in a weighing application with a specified load capacity of less than a kilogram can have a coating on its strain gauges with an overall thickness, e.g., a combined thickness of a multilayered coating, of up to ten microns, preferably however less than five microns and with particular preference less than one micron. In force-measuring cells with a capacity up to five kilograms, the overall thickness of a multilayered coating may be up to fifteen microns, preferably less than ten microns and with particular preference less than five microns. Strain gauges installed in force-measuring cells with a capacity above five kilograms and up to about 50 kilograms can be covered by a multi-layered coating or also by a foil with a multilayered coating in a thickness range of microns without finding a noticeable effect on the weighing result from the bypass forces.

The multilayered coating 16 can be built up of an alternating sequence in which a polymer layer 19, in particular a polyacrylate- or polymethacrylate layer is followed by a barrier layer 20, preferably of silicon oxide or aluminum oxide. Depending on the selection of an effective deposition method, the materials used will be of uniform consistency and each of the individual layers in itself will be homogeneous. The boundary layer against the carrier substrate 15 and against the resistor track 14 and the connector electrodes 17 is a polymer layer 19'. It is not necessary for the boundary layer to the ambient atmosphere to be a polymer layer, because a finishing polymer layer 19' provides good mechanical and, if necessary, chemical protection for a last barrier layer 20. This means that the selection of a suitable polymer material for the finishing polymer layer 19' can be based on the ability to provide a particularly good mechanical and/or chemical protection.

One may also find it desirable to apply a coating only to part of the surface area of a strain gauge 13. It is possible to coat only the meander pattern of the resistor track 14 because this is where penetrating moisture has the largest influence, or the coating could be applied with preference at the return loops 22 of the meander pattern (see FIG. 3) of the resistor track 14. In order to avoid possible problems that could occur in the process of electrically contacting the resistor track 14 through the connector electrodes 17, the electrodes 17 can be left free of a coating. This can involve the use of masks that leave the areas free that are to be coated.

Figure 5:
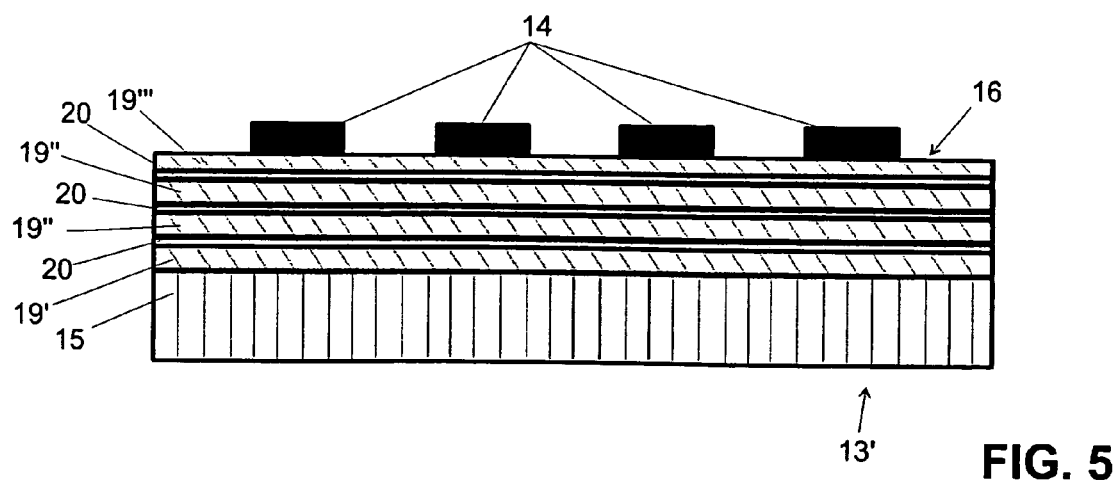
FIG. 5 represents a sectional view of another embodiment of a strain gauge with a multilayered coating that is applied directly to the carrier substrate.

The manufacture of polymer foils of large area dimensions can be provided with a multilayered coating 16 of the foregoing description, for example polyimide foils which, after having been coated, are used as carrier substrate material for strain gauges, meaning that they are provided with a resistor track on the coated side. A strain gauge 13' of this type is shown in a schematically simplified form in FIG. 5, where the multilayered coating 16 consists of seven individual layers. The installation of strain gauges 13' of this kind for example on the deformable body 1 of a force-measuring cell is performed in the customary manner. In this case it is not the resistor track 14 per se that is protected from changes in the humidity of the ambient atmosphere, but the carrier substrate 15 which causes measurement errors due to moisture absorption as described above is to a large extent protected so that the moisture-related effects on the measuring result are at least reduced.

A strain gauge 13' with a resistor pattern 14 on the side of the substrate 15 that carries the multilayered coating 16 can also be installed on the deformable body 1 of a force-measuring cell with the resistor pattern 14 facing towards the deformable body 1, in which case the resistor track 14 is imbedded in an adhesive bonding material which simultaneously functions as an electrically insulating boundary layer. The coated carrier substrate foil which is of a limited thickness performs in this case the function of the protective covering and protects especially the adhesive layer 21 and the resistor track 14 from the influence of a fluctuating humidity.

On a carrier substrate foil that has already been provided with a multilayered coating 16 for protection from moisture penetration, the strain-sensitive resistor track 14 can also be put on the non-coated side. In this case, the strain gauge should be installed so that the resistor track 14 faces towards the deformable body and is imbedded in an adhesive bonding material with very good electric insulator properties. With this type of strain gauge, too, a carrier substrate foil with a preferred thickness of only a few microns should be selected for force-measuring cells of low to medium load capacity. When using strain gauges of this type in a force-measuring cell, it may prove to be useful to apply an electrically insulating surface coating to the deformable body at least in the areas of the bending zones before the strain gauge is applied, so that the electrical insulator function does not have to be performed exclusively by the adhesive layer.

Besides, the methods for installing strain gauges according to the foregoing description do not exclude the use of carrier substrate foils that are coated on both sides.

An exemplary multilayered coating 16 consisting of an alternating sequence of polymer layers 19 and barrier layers 20 can also be easily deposited on a thin polymer foil, for example of a polyacrylate, polymethacrylate, polyimide, PET, fluor polymer, or one of the polymers mentioned in the introduction as being suitable for use as carrier substrate material. The coated foil is subsequently laminated onto a strain gauge 13 either with the multilayered coating 16 or with the non-coated side of the thin polymer foil in surface contact with the carrier substrate 15 and the resistor track 14. This arrangement as well as the preceding concept of using a coated substrate carrier foil has the advantage that the coating of foils is very cost-effective as an industrial process.

A foil with a multilayered configuration of this type can also be put on top of a strain gauge 13 that has been installed directly on a deformable body 1 of a force-measuring cell that can be configured for intermediate to high load capacities. In this case it is not absolutely necessary for the strain gauge to be connected to a foil as a carrier substrate 15. The strain gauge can also be arranged directly on an electrically insulating coating of the deformable body 1, where the deformable body 1 with the electrical insulator coating produced for example by anodizing a deformable body of aluminum serves as carrier for the resistor track 14 and the connector electrodes 17.

An exemplary method of producing a multilayered coating 16 on an individual strain gauge 13 or on a strain gauge 13 that is already installed on the deformable body 1 of a force-measuring cell includes the following steps:

applying a polymer layer 19' with a smoothing effect in the nanometer range and with a thickness between 200 nm and 1500 nm to at least a part of the resistor track 14 and/or the connector electrodes 17 and/or the carrier substrate 15 and in some cases to the deformable body 1;

depositing a barrier layer 20' with a thickness of about 20 nm on the polymer layer 19';

depositing a further thin polymer layer 19" with a thickness of about 100 nm to 200 nm on the barrier layer 20; and for any desired number of times, repeating the sequence of depositing a barrier layer 20 and a polymer layer 19", with either a polymer layer 19' or a thin barrier layer 20 forming the boundary layer to the ambient atmosphere.

An analogous procedure is used to coat a single-row arrangement or a two-dimensional arrangement of strain gauges.

Prior to the start of the coating process the base surface for the multilayered coating 16 can be subjected to a plasma cleaning or a chemical cleaning, regardless of whether the base surface is constituted by the carrier substrate 15, a carrier foil, the resistor track pattern 14, or part of the deformable body 1 of a force-measuring cell.

A large selection of deposition methods is available for the application of a multilayered coating. Examples for producing the barrier layers 20 that should be named here include vapor deposition in vacuum, vapor deposition in air, plasma deposition, sputtering, sol-gel methods, chemical vapor deposition (CVD), combustion chemical vapor deposition (CCVD), plasma enhanced chemical vapor deposition (PECVD), plasma impulse chemical vapor deposition (PICVD), as well as electrochemical deposition which is used in particular for the deposition of metals. The following deposition techniques are possible for the application of polymer layers: vapor deposition in vacuum, vapor deposition in air, in-situ polymerization of monomers or oligomers that have been deposited by flash evaporation or plasma deposition, as well as electrophoresis, cataphoresis, or anaphoresis.

It has proven to be a particularly efficient method for applying a multilayered coating to strain gauges 13 that are installed or are designed to be installed on the deformable body 1 of a force-measuring cell, if the build-up of the multilayered coating 16 with the alternating deposition of polymer layers 19 and barrier layers 20 in a deposition apparatus is performed by means of two sources in a single work operation.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A force measuring cell comprising:

a deformable body and at least one strain gauge installed on the deformable body, wherein the at least one strain gauge has a strain-sensitive electrical resistor track and connector electrodes for contacting the resistor track arranged on a carrier substrate;

wherein the at least one strain gauge and a part of the deformable body are provided with a multilayered coating composed of an alternating sequence of a polymer layer and a barrier layer, wherein the multilayered coating is formed of at least three thin individual layers, each of which was produced during a deposition process to adhere to its respective underlying surface, wherein a polymer layer forms a boundary layer to the strain gauge and to the part of the deformable body that is covered by the multilayered coating; and wherein the polymer layer performs a smoothing function of surface roughness of an area to be coated and covers edges and surfaces that are perpendicular to a plane of the polymer layer.

2. The force-measuring cell according to claim 1, comprising:

an insulating sublayer below the smoothing polymer layer.

3. The force-measuring cell according to claim 1, wherein a polymer layer forms a boundary layer of the multilayered coating against ambient atmosphere.

4. The force-measuring cell according to claim 1, wherein the barrier layer has a layer thickness between 5 nm and 500 nm, preferably between 10 nm and 50 nm.

5. The force-measuring cell according to claim 1, wherein a polymer layer has a layer thickness between 50 nm and 1500 nm, in particular between 100 nm and 200 nm.

6. The force-measuring cell according to claim 1, wherein an overall thickness of the multilayered coating is at most ten microns, preferably in a range below one micron.

7. The force-measuring cell according to claim 1, wherein the polymer layer that forms the boundary layer to the strain gauge and to the part of the deformable body that is covered by the multilayered coating has a greater layer thickness than the polymer layers that follow in build-up of the multilayered coating, to allow the polymer layer to smooth out the surface roughness of the strain gauge and the deformable body.

8. The force-measuring cell according to claim 1, wherein the barrier layer consists of an insulator material, in particular an oxide, boride, nitride, fluoride, carbide, a combination of any of these materials, or a ceramic mixture, or a diamond-like carbon.

9. The force-measuring cell according to claim 1, wherein the barrier layer consists of a silicon oxide, silicon nitride, titanium oxide, titanium nitride, aluminum oxide, or chromium oxide.

10. The force-measuring cell according to claim 1, wherein the barrier layer consists of metal, in particular of aluminum, silver, gold, copper, chromium, titanium, nickel, a metal alloy, or an inter-metallic compound.

11. The force-measuring cell according to claim 1, wherein the polymer layer consists of an inorganic-organic hybrid polymer.

12. The force-measuring cell according to claim 1, wherein the barrier layer comprises at least two sublayers, wherein the sublayers consist of the same or different materials, in particular of inorganic materials.

13. The force-measuring cell according to claim 1, wherein the polymer layer comprises at least two sublayers, wherein the sublayers consist of the same or different polymer materials.

14. The force-measuring cell according to claim 1, wherein the barrier layer was produced by one of the following deposition methods: vapor-deposition in vacuum, vapor-deposition in air, plasma deposition, sputtering, sol-gel methods, chemical vapor deposition, combustion chemical vapor deposition, plasma enhanced chemical vapor deposition, plasma impulse chemical vapor deposition, or electrochemical deposition which is used in particular for the deposition of metals.

15. The force-measuring cell according to claim 1, wherein the polymer layer was produced by means of vapor-deposition in vacuum, vapor-deposition in air, in-situ polymerization of monomers or oligomers that have been deposited by flash evaporation or plasma deposition, by spin-coating, electrophoresis, cataphoresis or anaphoresis.

16. The force-measuring cell according to claim 1, wherein the resistor track has a meandering shape.

17. The force-measuring cell according to claim 16, wherein the multilayered coating is present as a partial coating of the strain gauge in the area of the resistor track, in particular in areas of return loops of the meander-shaped resistor track.

18. A strain gauge comprising:
a strain-sensitive resistor track; and
connector electrodes that provide a contact connection to the resistor track, wherein the resistor track and connector electrodes are arranged on a carrier substrate, wherein the strain gauge is provided with a multilayered coating covering at least one of a part of the carrier substrate, the resistor track, and the connector electrodes as a protective coating;
wherein the multilayered coating is composed of an alternating sequence of a polymer layer and a barrier layer;
wherein the multilayered coating consists of at least three thin deposition layers, each of which was produced during a deposition process to adhere to its respective underlying surface; and
wherein a polymer layer forms the boundary layer of the multilayered coating against at least one of the carrier substrate and the resistor track, which polymer layer performs a smoothing function of surface roughness of an area to be coated and covers edges and surfaces that are perpendicular to a plane of the polymer layer.

19. The strain gauge according to claim 18, comprising:
an insulating sublayer underneath the surface-smoothing polymer layer.

20. The strain gauge according to claim 18, comprising:
a polymer layer forms the boundary layer of the multilayered coating against ambient atmosphere.

21. The strain gauge according to claim 18, wherein a barrier layer has a layer thickness between 5 nm and 500 nm, preferably between 10 nm and 50 nm.

22. The strain gauge according to claim 18, wherein a polymer layer thickness between 50 nm and 1500 nm, in particular between 100 nm and 200 nm.

23. The strain gauge according to claim 18, wherein the overall coating thickness of the multilayered coating is at most ten microns, preferably in the range below one micron.

24. The strain gauge according to claim 18, wherein the polymer layer that forms the boundary layer to the carrier substrate and, where applicable, to the resistor track has a greater layer thickness than the polymer layers that follow in the build-up of the multilayered coating, to allow the polymer layer to smooth out the surface roughness of the carrier substrate and the resistor track.

25. The strain gauge according to claim 18, wherein a barrier layer consists of an insulator material, in particular an oxide, boride, nitride, fluoride, carbide, a combination of any of these materials, or a ceramic mixture, or a diamond-like carbon.

26. The strain gauge according to claim 18, wherein the barrier layer consists of a silicon oxide, silicon nitride, titanium oxide, titanium nitride, aluminum oxide, or chromium oxide.

27. The strain gauge according to claim 18, wherein a barrier layer consists of metal, in particular of aluminum, silver, gold, copper, chromium, titanium, nickel, a metal alloy, or an inter-metallic compound.

28. The strain gauge according to claim 18, wherein a polymer layer consists of an inorganic-organic hybrid polymer.

29. The strain gauge according to claim 18, wherein a barrier layer comprises at least two sublayers, wherein the sublayers consist of the same or different materials, in particular of inorganic materials.

30. The strain gauge according to claim 18, wherein a polymer layer comprises at least two sublayers, wherein the sublayers consist of the same or different polymer materials.

31. The strain gauge according to claim 18, wherein a barrier layer is produced by one of the following deposition methods: vapor-deposition in vacuum, vapor-deposition in air, plasma deposition, sputtering, sol-gel methods, chemical vapor deposition, combustion chemical vapor deposition, plasma enhanced chemical vapor deposition, plasma impulse chemical vapor deposition, or electrochemical deposition which is used in particular for the deposition of metals.

32. The strain gauge according to claim 18, wherein a polymer layer was produced by vapor-deposition in vacuum, vapor-deposition in air, in-situ polymerization of monomers or oligomers that have been deposited by flash evaporation or plasma deposition, by spin-coating, electrophoresis, cataphoresis or anaphoresis.

33. The strain gauge according to claim 18, wherein the resistor track has a meandering shape.

34. The strain gauge according to claim 33, wherein the multilayered coating is present as a partial coating in an area of the resistor track, in particular in areas of return loops of the meander-shaped resistor track.

35. The strain gauge according to claim 18, wherein a plurality of strain gauges are present in a single-row array or in a two-dimensional array.

36. A single-row array or two-dimensional array of strain gauges, wherein said strain gauges have a strain-sensitive electrical resistor track and connector electrodes for contacting the resistor track arranged on a carrier substrate, wherein the carrier substrate of the single-row array or two-dimensional array is perforated by an arrangement of slits with connecting portions left in place through which the carrier substrates of neighboring strain gauges are connected to each other, and wherein a multilayered coating is put as a protective coating on the single-row array or two-dimensional array of strain gauges after it has been provided with an arrangement of slits, wherein each layer of the protective coating was produced during a deposition process to adhere to its respective underlying surface.

37. The single-row array or two-dimensional array according to claim 36, wherein the arrangement of slits consists of slits that extend along sides of a strain gauge, wherein each of the slits extends over nearly an entire length of a side of a strain gauge.

38. A method of producing a multilayered coating as a protective coating on a force-measuring cell with a deformable body and with at least one strain gauge installed on the deformable body, wherein the at least one strain gauge has a strain-sensitive electrical resistor track and connector electrodes for contacting the resistor track arranged on a carrier substrate, comprising:

applying a surface-smoothing polymer layer that covers edges and also covers surfaces perpendicular to a plane of the layer to at least one of a part of the carrier substrate, the resistor track, and connector electrodes and a portion of the deformable body; and depositing a thin barrier layer on the polymer layer, which barrier layer is followed by a further thin polymer layer wherein an alternating sequence of depositing a thin barrier layer and a thin polymer layer is repeated a desired number of times, with either a polymer layer or a thin barrier layer forming the boundary layer to ambient atmosphere, and with the multilayered coating being composed of at least three individual layers each of which is produced during a deposition process to adhere to its respective underlying surface.

39. The method according to claim 38, wherein the barrier layers are produced by vapor-deposition in vacuum, vapor-deposition in air, plasma deposition, sputtering, sol-gel methods, chemical vapor deposition, plasma impulse chemical vapor deposition, combustion chemical vapor deposition, plasma enhanced chemical vapor deposition, or electrochemical deposition which is used in particular for the deposition of metals.

40. The method according to claim 39, wherein by changing deposition parameters during production of the barrier layers, the barrier layers grow into at least two sublayers.

41. The method according to claim 38, wherein the production of the multilayered coating is performed through an alternating deposition of polymer layers and barrier layers in a deposition apparatus by means of two sources in a single work operation.

42. The method according to claim 38, wherein an underlying base surface of the multilayered coating is subjected to a plasma-cleaning or chemical cleaning procedure prior to the deposition process.

43. A method of producing a multilayered coating on an individual strain gauge or on a single-row array or two-dimensional array of strain gauges, wherein said strain gauges have a strain-sensitive electrical resistor track and connector electrodes for contacting the resistor track arranged on a carrier substrate, comprising:

applying a surface-smoothing polymer layer that covers edges and also covers surfaces perpendicular to the plane of the layer to at least one of a part of the carrier substrate, the resistor track, and the connector electrodes; and depositing a thin layer on the polymer layer, which barrier layer is followed by a further thin polymer layer, wherein an alternating sequence of depositing a thin barrier layer and a thin polymer layer is repeated a desired number of times, with either a polymer layer or a thin barrier layer forming the boundary layer to ambient atmosphere, and with the multilayered coating being composed of at least three individual layers each of which is produced during a deposition process to adhere to its respective underlying surface.

44. The method according to claim 43, wherein the multilayered coating is deposited on the carrier substrate of a strain gauge and the resistor track and the connector electrodes are subsequently put on top of the multilayered coating.

45. The method according to claim 44, wherein the multilayered coating is deposited on the carrier substrate of a strain gauge, and the resistor track and the connector electrodes are arranged on the opposite side of the carrier substrate.

46. The method according to claim 45, wherein the coated strain gauge is bonded to the deformable body of a force-measuring cell by an electrically insulating adhesive material, wherein the resistor track is located on the side of the coated strain gauge that faces towards the deformable body.

47. The method according to claim 44, wherein polymer layers are produced by vapor-deposition in vacuum, vapor-deposition in air, in-situ polymerization of monomers or oligomers that have been deposited by flash evaporation or plasma deposition, by spin-coating, electrophoresis, cataphoresis or anaphoresis.

48. The method according to claim 47, wherein by changing deposition parameters during production of the polymer layers, the polymer layers grow into at least two sublayers.

49. A method of producing a protective coating on a single-row array or two-dimensional array of strain gauges, wherein said strain gauges have a strain-sensitive electrical resistor track and connector electrodes for contacting the resistor track arranged on a carrier substrate, comprising:

prior to a coating process, the carrier substrate of the single-row array or two-dimensional array is perforated by an arrangement of slits to create connecting portions through which the carrier substrates of neighboring strain gauges are connected to each other; and placing a multilayered coating as a protective coating on the single-row array or two-dimensional array of strain gauges after it has been provided with an arrangement of slits, wherein each layer of the protective coating is produced during a deposition process to adhere to its respective underlying surface.

50. The method according to claim 49, wherein an arrangement of slits is produced as slits that extend along sides of a strain gauge, wherein each of the slits extends over nearly an entire length of a side of a strain gauge.

51. The method according to claim 49, wherein for producing the arrangement of slits, material is die-punched out of the carrier substrate.

* * * * *